United States Patent [19]
Umezawa

[11] Patent Number: 5,730,259
[45] Date of Patent: Mar. 24, 1998

[54] METHOD OF PRODUCING WET FRICTIONAL PLATE

[75] Inventor: Shigeki Umezawa, Shizuoka, Japan

[73] Assignee: NSK-Warner Kabushiki Kaisha, Tokyo, Japan

[21] Appl. No.: 606,730

[22] Filed: Feb. 27, 1996

[30] Foreign Application Priority Data

Feb. 27, 1995 [JP] Japan .................. 7-061523

[51] Int. Cl.$^6$ .................................. F16D 69/00
[52] U.S. Cl. .......................... 188/250 G; 188/250
[58] Field of Search .................. 192/107 M, 107 R, 192/70.14, 113.34, 113.36, 113.28; 188/250 B, 250 G

[56] References Cited

U.S. PATENT DOCUMENTS

| | | | |
|---|---|---|---|
| 4,676,347 | 6/1987 | Rees | 188/250 G |
| 5,094,331 | 3/1992 | Fujimoto | 192/70.2 |
| 5,553,371 | 9/1996 | Uchino | 29/527.2 |
| 5,566,793 | 10/1996 | Kahr | 188/250 G |

*Primary Examiner*—Robert J. Oberleitner
*Assistant Examiner*—C. J. Bartz
*Attorney, Agent, or Firm*—Sughrue, Mion, Zinn, Macpeak & Seas, PLLC

[57] ABSTRACT

A wet frictional plate including a made of a metal plate that is formed so as to have a plate thickness which changes to gradually increase from its outer circumferential portion toward its inner circumferential portion. Frictional materials are bonded to the surfaces of the metal plate while they are pressed and heated to make the frictional surfaces of the frictional materials parallel to each other. As a result, the density of the frictional materials increases in a direction from the outer circumferential portion of the wet frictional plate toward its inner circumferential portion.

25 Claims, 5 Drawing Sheets

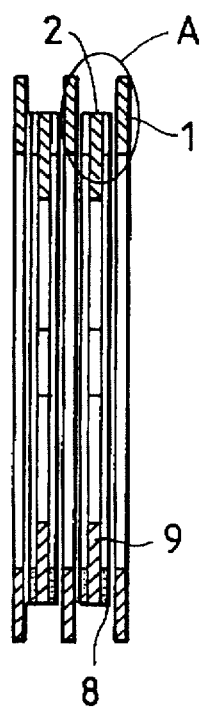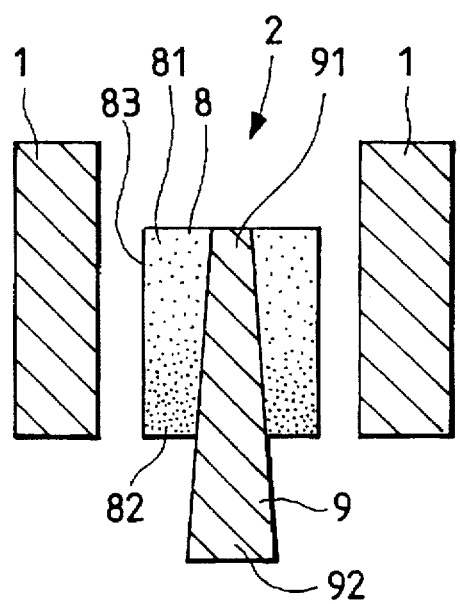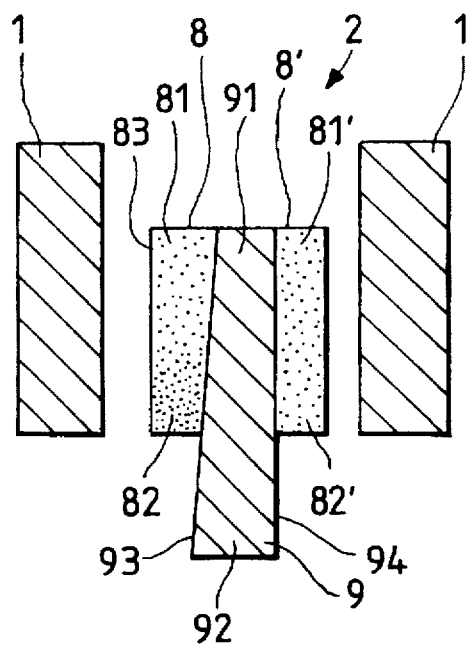

METHOD OF PRODUCING WET FRICTIONAL PLATE

BACKGROUND OF THE INVENTION

1. Field of the Invention

The present invention relates to a method of producing wet frictional plates of a wet multi-plate frictional engagement device for use as a clutch, a brake, and the like.

2. Description of the Related Art

As an example of a conventional wet multi-plate frictional engagement device, a typical configuration of a multi-plate clutch is shown in FIG. 1. In the drawing, torque is transmitted through contact between a driving plate 2 fitted in a spline portion 51 of a hub 5 mounted on an input shaft 6 and a driven plate 1 fitted in a spline portion 41 of a retainer 4. The reference numerals 3 and 7 represent a pressure plate and a piston, respectively.

In view of problems concerning energy and environment, at present, the frictional engagement device is required to be small in size, light in weight, small in operation shock, and high in torque capacity on one hand, and to cope with the tendency of car engine's energy which becomes higher and higher as the rotation speed and output of the car engine become higher and higher on the other hand. The requirement is very high.

In a conventional frictional engagement device, in order to suppress self-excited vibration of judder, or the like, of a clutch employing slip control so as to reduce fuel expenses, an additional agent for reducing the friction coefficient is blended into lubricating oil. Further, lubricating oil into which an additional agent for reducing the friction coefficient is blended is often used to reduce operation shock. Thus, the surface temperature rising due to frictional heat caused by prolongation of slip time because of low torque capacity prompts the plasticization of the thermosetting resin, which is the phenomenon that the thermosetting resin in the surface of the frictional material is hardened again or carbonized by the frictional heat so that the frictional surface becomes a mirror surface. Accordingly, a fade phenomenon, extreme reduction in friction coefficient, or the like, is generated to thereby cause a problem in the heat resistance and durability. As another event, the additional agent within the lubricating oil separates out by the frictional heat and deposits on the surface of the frictional material and on the mate slide surface opposite thereto so that the porous surface of the frictional material is loaded. Thus, there arises a case where the original property cannot be exhibited to reduce the friction coefficient, similarly to the above case.

Even if the operation pressing force is made high and the slide time is made short to cope with the above problems, there arise problems concerning the durability, lifetime, etc., such as reduction of peel lifetime of the frictional material due to repetitive compression fatigue by high surface pressure, generation of heat spots or thermal transformation in the mate frictional surface (driven plate) due to the rising of the rate of heat generation per unit time, a larger size hydraulic pump for generating high hydraulic pressure, leakage of operation oil, etc. Further, in the case where the quantity of impregnation of the thermosetting resin is increased to thereby improve the strength of the frictional material in order to improve the peel lifetime of the frictional material, deterioration of the frictional characteristics (operation shocks) due to lack of flexibility of the frictional material, deterioration of the fitness due to the influence of the resin layer of the surface of the frictional material indicating changes in friction coefficient in the original state after experience of engagement at the time of a new product, transfer and deposition of the additional agent onto the frictional material from the mate slide surface by the chipping of the additional agent deposited on the mate slide surface because the fibrous structure of the surface of the frictional material is strengthened by the resin, lowering of the friction coefficient due to such transfer/deposition, etc. may be generated. Thus, the influence of the additional agent in the lubricating oil has caused various problems.

Further, the thermosetting resin is a material constituting the wet frictional material (composite fibrous paper) and the resin of this kind includes phenol resin, epoxy resin, urea resin, melamine resin, silicone resin, and the like. As the wet frictional material, a known type is produced through a paper making process in which a filler and a friction adjusting agent are blended into a fibrous base such as natural pulp fibers, organic synthesized fibers, or the like, the mixture is subjected to paper making to prepare raw paper, and the raw paper is then impregnated with thermosetting resin which is heated and hardened to thereby produce a frictional material after a diluting solvent is evaporated in a drying step.

Since the frictional material is a porous matter, the resin applied as a coating onto the fibrous base is one of the factors for determining the pore opening formed in the surface and inside of the frictional material. The influence of the resin is such that the pore opening is reduced by the resin so that the lubricating oil hardly enters the inside of the frictional material at the time of engagement to cause an increase of the operation shock due to prolongation of the operation time.

Further, the torque of the frictional plate is larger at its outer circumferential side than at its inner circumferential side. Plasticization of the frictional material due to sudden temperature rising by frictional heat is apt to be caused in the outer circumferential, portion of the frictional material. Generation of heat spots on or thermal transformation of the mate metal plate (driven plate) by the difference of heat distribution cannot be avoided. Although a measure in which different frictional materials are separately bonded onto the inner and outer circumferential portions (heat resistance frictional material is bonded to the outer circumferential portion) is tried at present, there still remains a problem such as increase of the cost, etc.

SUMMARY OF THE INVENTION

It is an object of the present invention to provide a method of producing wet frictional plates for use in a wet frictional engagement device which are good in heat resistance and durability and in operation shock.

A method of producing a wet frictional plate for use in a multi-plate frictional engagement device according to the present invention is comprised of the steps of: forming a metal plate to be a core metal of the wet frictional plate to have a plate thickness which changes to gradually increase from an outer circumferential side of the metal plate toward an inner circumferential side of the metal plate; and bonding wet frictional materials to opposite surfaces of the metal plate while pressing and heating so that respective frictional surfaces of the wet frictional materials are parallel to each other.

In the method of producing frictional materials according to the present invention as described above, it is possible to produce a frictional plate in which the distribution of the density of the frictional material is inclined radially and it is possible to obtain a frictional engagement device in which the frictional coefficient is high and stable and which is excellent in heat resistance and peel lifetime.

BRIEF DESCRIPTION OF THE DRAWINGS

In the accompanying drawings;

FIG. 3 is a side sectional view showing the state of engagement of the frictional plates;

FIG. 4 is an enlarged explanatory view of the portion A of FIG. 3;

FIG. 5 is an enlarged explanatory view of the portion A of FIG. 3;

DETAILED DESCRIPTION OF THE INVENTION

A detailed description of the present invention will be described referring to the accompanying drawings as follows.

Figure 1:
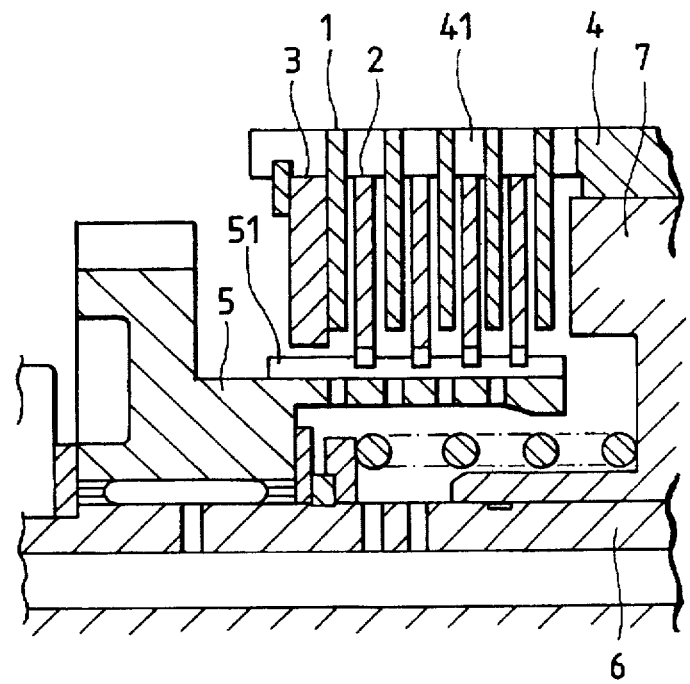
FIG. 1 is a side sectional view showing the configuration of a multi-plate frictional engagement device.
Figure 2:
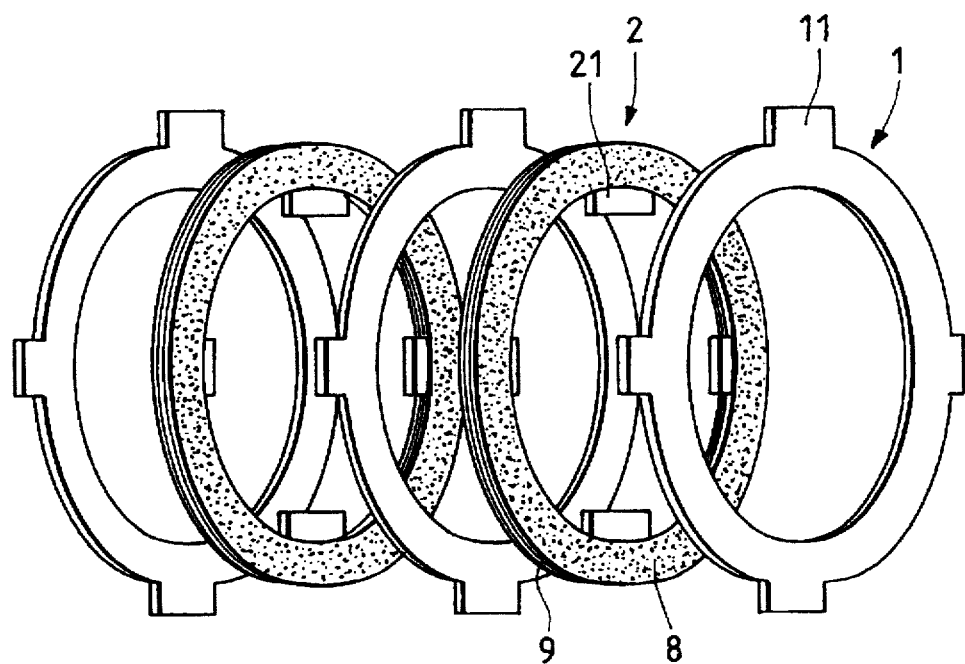
FIG. 2 is a perspective view showing the arrangement of the frictional plates.
Figure 6:
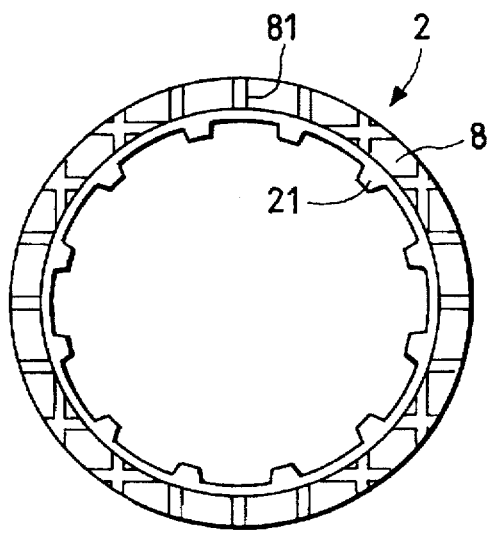
FIG. 6 is a plan view showing an example of the frictional plate.
Figure 7:
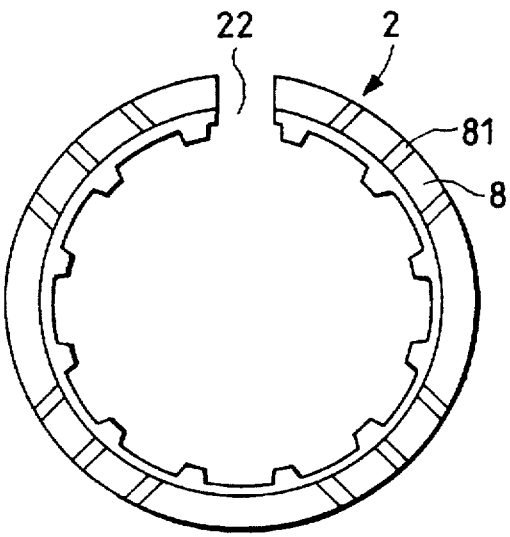
FIG. 7 is a plan view showing an example of the frictional plate.

FIG. 1 is a view showing a state of arrangement of frictional plates in a wet frictional engagement device. FIG. 2 is a perspective view showing the arrangement of the frictional plates. FIG. 3 is a sectional view of the frictional plates in a bonded state. In the drawings, the reference numerals 1 and 2 represent a driven plate and a driving plate which have spline teeth 11 and 21, respectively. As seen from FIG. 2, each driven plate 1 is constituted by only a metal plate, while each driving plate 2 is constituted by a metal plate 9 (for example a steel plate) which becomes a core metal and frictional materials 8 bonded on the surfaces of the metal plate 9. The reference numeral 21 designate a spline tooth.

The producing method of the present invention will be described with reference to FIGS. 4 and 5 each of which is a conceptual explanatory view showing, in enlargement, the portion A in FIG. 3. First, if a sheet of belt-shaped metal plate is bent in its longitudinal direction so as to be annular to make its opposite end surfaces contact or approach each other, the outer circumferential portion comes into an expanded state while the inner circumferential portion comes into a compressed state so that the plate thickness has a gradient in the direction of width in accordance with the bending radius and the width. That is, as illustrated by the metal plate 9 shown in FIG. 4, the metal plate 9 is shaped so that its plate thickness becomes smaller and smaller from its inner circumferential portion toward its outer circumferential portion.

Next, a filler and a friction adjusting agent are blended into a fibrous base such as natural pulp fibers, organic synthesized fibers, or the like, and the mixture is subjected to paper making to prepare raw paper. The filler and a friction adjusting agent used in the present invention are similar to the conventional ones. For example, the filler is diatomaceous earth, clay, wollastonite, silica, carbonate and the like, and the frictional material is cashew resin, resin particle, rubber particle, graphite, cokes, mica and the like. The raw paper is then impregnated with thermosetting resin to thereby prepare a frictional material after a diluting solvent is evaporated in a drying step. The frictional materials are bonded to the metal plate so as to make the front surfaces of the frictional materials parallel to each other while the frictional materials are pressed and heated to thereby harden the thermosetting resin completely. At that time, a bonding agent for bonding the two with each other is applied in advance on the bonding surfaces of the metal plate or the frictional materials.

As shown in FIG. 4, the plate thickness of the metal plate 9 which is a core metal becomes larger and larger from its outer circumferential portion 91 toward its inner circumferential portion 92 as described above. Accordingly, if the frictional materials 8 are bonded onto the surfaces of the metal plate 9 so that the respective frictional surfaces 83 of the frictional materials 8 are parallel to each other, as seen in the drawing, the inner circumferential portion 82 is more compressed than the outer circumferential portion 81 so that the density of the frictional materials 8 becomes larger and larger in the direction from the outer circumferential portion 81 toward the inner circumferential portion 82.

The frictional plate produced by the method according to the present invention has the following excellent characteristics.

1. Since the frictional plate has a gradient function that the density becomes smaller (the porosity becomes larger) in the direction from the inner circumferential side toward the outer circumferential side, the temperature rising due to heat generation at the outer circumferential side can be cooled rapidly by the lubricating oil held in the inside of the frictional material and the heat resistance and durability are improved, that is, generation of heat spots, thermal transformation, etc., can be prevented.

2. As the position goes toward the outer circumferential side, the density decreases and the flexibility increases, so that the substantial contact area increases and the torque capacity increases to thereby improve the fatigue lifetime. Particularly, in the case where the mate metal plate is an outer-side spline such as a driven plate 1 shown in FIG. 2, a swell portion worked by a press, or the like, remains on a slide surface (particularly in a spline portion). Therefore, in a conventional product, a local abutment or contact area decreases to thereby cause reduction in torque capacity and reduction in fatigue lifetime due to repetitive compression shearing.

3. Micro vibrations are absorbed by the increase of flexibility and the operation shock reducing effect is high. Further, the step of changing the plate thickness of the metal plate is not limited only to the method of bending a sheet of belt-shaped metal plate in its longitudinal direction but the plate thickness can be changed by reducing the outer circumferential side by cutting, rolling, or the like.

FIG. 5 is another example illustrating a configuration similar to that of FIG. 4. A metal plate 9 shown in FIG. 5 is worked so that only a surface 93 on the left side in the drawing is inclined so that the plate thickness becomes thicker from its outer circumferential portion 91 toward an inner circumferential portion 92, while a surface 94 on the right side in the drawing is kept perpendicular to a center axis of the frictional plate. Then, since the surface 83 of the frictional material 8 bonded to the surface 93 side of the metal plate 9 is parallel, the frictional material 8 is more compressed on the inner circumferential side so the density of the frictional material 8 on its outer circumferential portion 81 becomes smaller than that on its inner circumferential portion 82, similarly to the case in FIG. 4.

On the other hand, it is not necessary to work the other frictional plate 8' bonded to the surface 94 side of the metal plate 9, and the density of the frictional material is not different from each other between its outer circumferential portion 81' and its inner circumferential portion 82'. By the way, in FIGS. 4 and 5, the reference numerals 1 and 2 designate a driven plate and a driving plate, respectively.

FIGS. 6 to 9 show various examples of shapes of the driving plate 2 other than that illustrated in FIG. 2. In the driving plate 2 in FIGS. 6 to 9, the reference numerals 21 and 8 designate the spline tooth and a frictional plate, respectively.

In a frictional engagement device, how to reduce the drag torque (pulling torque) in idle running becomes a problem. To cope with this problem, in the example of FIG. 6, oil grooves 81 are formed in the frictional material 8 to reduce the shearing resistance of the lubricating oil to thereby reduce the drag torque. In this case, however, sometimes the sectional area of the groove portion is reduced by the abrasion of the frictional material to lower the effect. Accordingly, in the example of FIG. 7, a notched portion 22 is provided in the frictional plate 2 to thereby ensure a sufficient sectional area of the groove portion.

Figure 8:
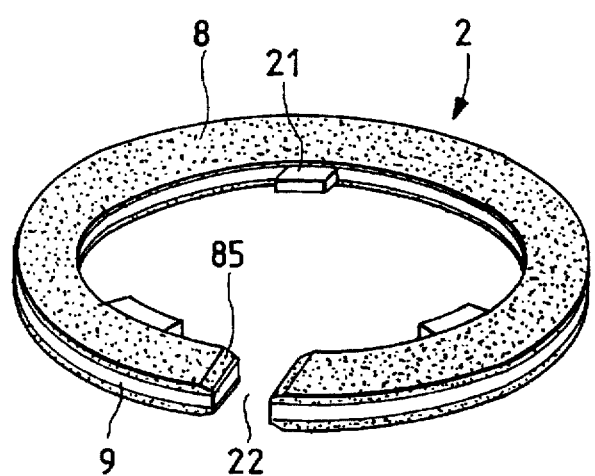
FIG. 8 is a perspective view showing an example of the frictional plate.
Figure 9:
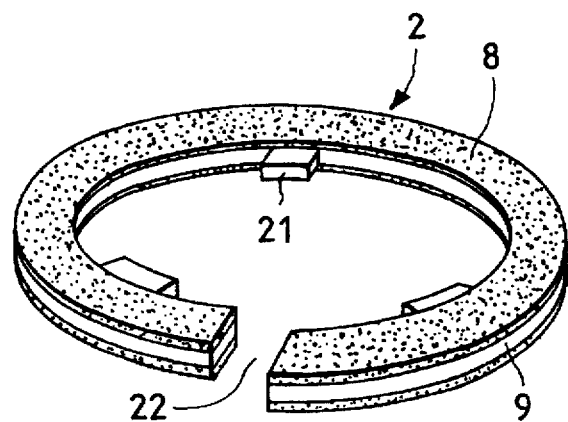
FIG. 9 is a perspective view showing another example of the frictional plate.

In the examples of FIGS. 8 and 9, it is intended to reduce the drag torque by provision of only a notched portion 22 without forming any oil grooves in the frictional material 8. In the example of FIG. 8, chamfered portions 85 are formed at the notched portion 22 so as to ensure the clearance between the frictional plates by a wedging action. In the example of FIG. 9, a difference in linearity is provided in the notched portion 22 so as to perform an action of separation of the frictional plates.

FIGS. 10 to 13 show the results of various comparison tests performed on a frictional plate $L_1$ prepared by the method according to the present invention, a comparative example frictional plate $L_2$ in which the density of the frictional material was made equal to that in the outer circumferential portion of $L_1$ (that is, the density was small as a whole), and a comparative example frictional plate $L_3$ in which the density of the frictional material was made equal to that in the inner circumferential portion of $L_1$ (that is, the density was large as a whole).

Figure 10:
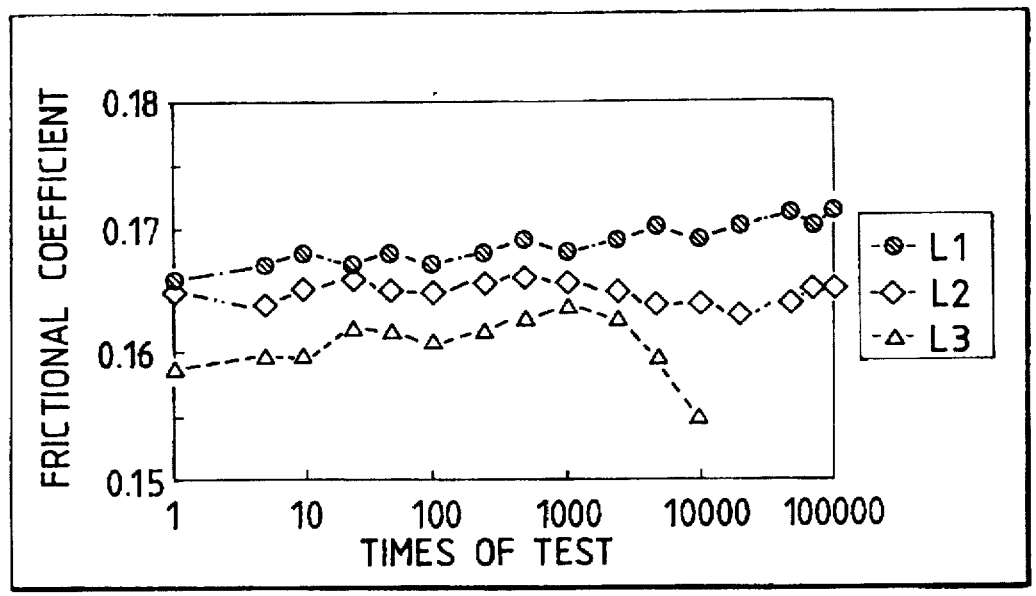
FIG. 10 is a comparison diagram of changes of the frictional coefficient between the device of the present invention and the conventional ones.

FIG. 10 shows the result of the durability test in the case of high rotational speed, high inertia, etc. with axes of ordinate and abscissa representing the frictional coefficient and the times of tests (cycles), respectively. In the frictional plate $L_1$ prepared by the method of the present invention, the frictional coefficient is stably kept without any initial reduction of the frictional coefficient in comparison with the conventional frictional plates $L_2$ and $L_3$. With respect to the conventional frictional plate $L_3$, the test was stopped after 10,000 cycles because of reduction of the frictional coefficient due to burning. In the conventional frictional plate $L_2$, peeling was located in the friction surface portion after completion of the test.

Figure 11:
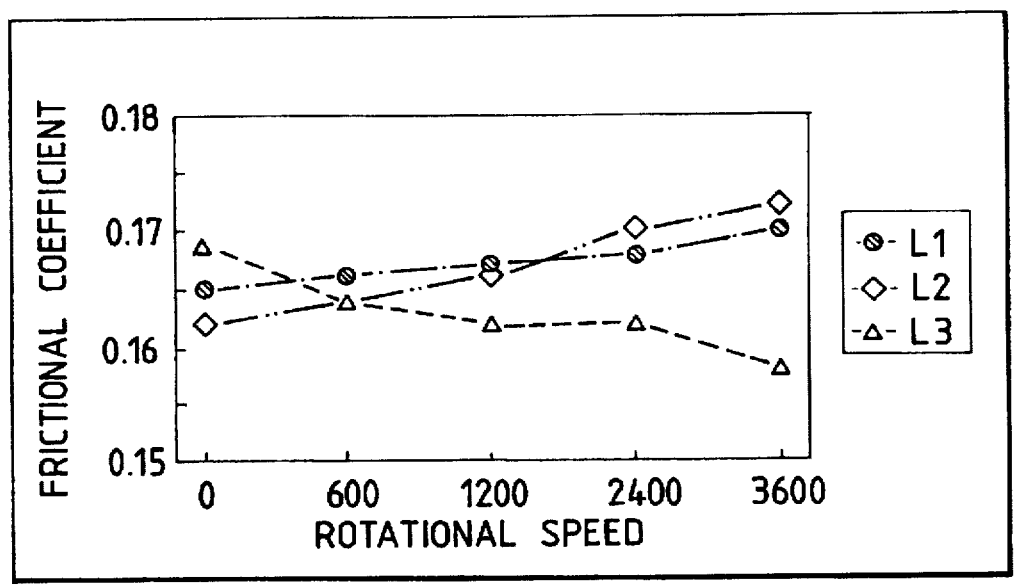
FIG. 11 is a comparison diagram of changes of the frictional coefficient between the device of the present invention and the conventional ones.

FIG. 11 shows the changes of the frictional coefficient with the change of rotation which may be an index of shock at the time of frictional engagement (100 cycles), with axes of ordinate and abscissa representing the frictional coefficient and the rotational speed (r.p.m.), respectively. The graphs of the frictional plates $L_1$ and $L_2$ have a rightward rising gradient to show that these frictional plates $L_1$ and $L_2$ are more advantageous against operation shocks.

Figure 12:
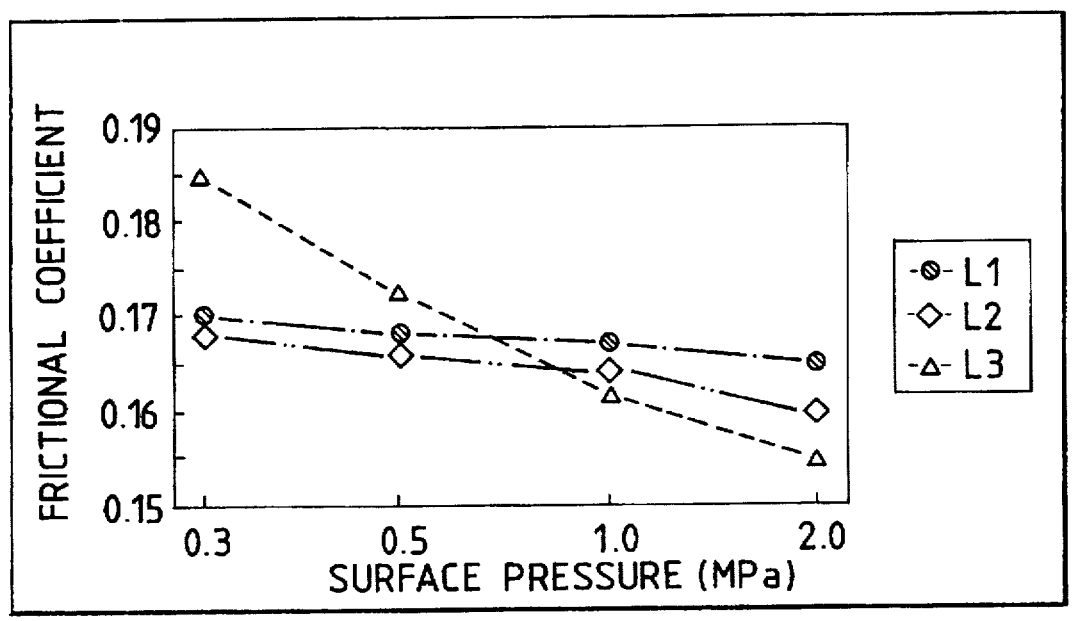
FIG. 12 is a comparison diagram of changes of the frictional coefficient between the device of the present invention and the conventional ones.

FIG. 12 shows the changes of the frictional coefficient with the change of surface pressure at 100 cycles with axes of ordinate and abscissa representing the frictional coefficient and the surface pressure (MPa), respectively. The frictional plate $L_1$ is insensitive to a change of the surface pressure so that it is possible to suppress the change of capacity of the frictional engagement device due to the change of the operation pushing force, it is possible to make the factor of safety of the setting capacity small, and it is possible to reduce the operation shock which is a difference between the setting capacity and the actual capacity.

Figure 13:
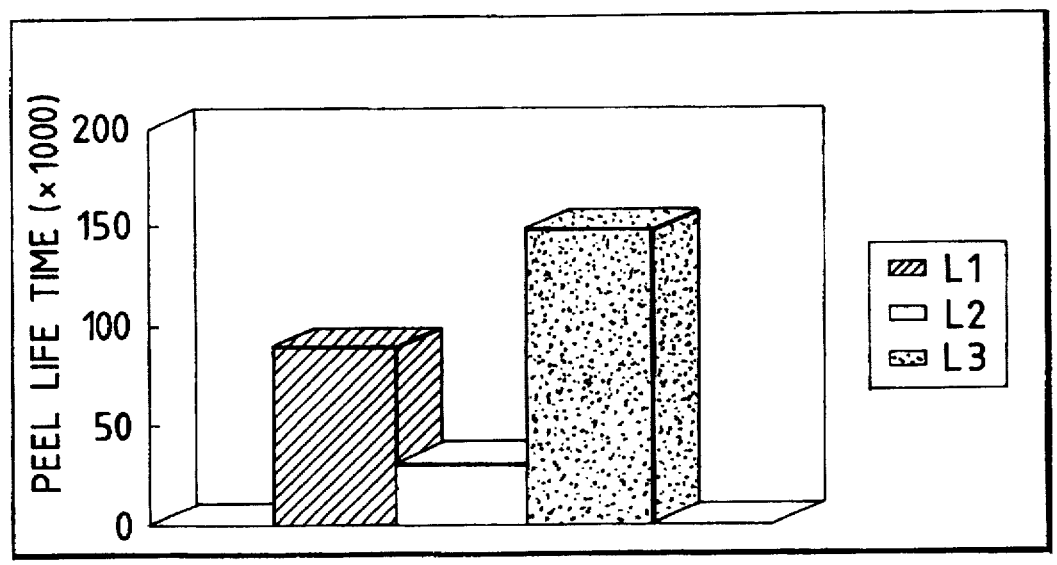
FIG. 13 is a comparison diagram of the peel lifetime between the device of the present invention and the conventional ones.

FIG. 13 shows the peel lifetime due to the repetitive compression shearing fatigue lifetime with the axis of coordinate representing the peel lifetime (hour). This shows that the frictional plate $L_3$ has the longest lifetime, but $L_1$ is particularly effective in comparison with the frictional plate $L_2$.

What is claimed is:

1. A method of producing a wet frictional plate for use in a multi-plate frictional engagement device comprising steps of:

forming a metal plate to be a core metal of said wet frictional plate and to have a plate thickness which changes to gradually increase from an outer circumferential side of said metal plate toward an inner circumferential side of said metal plate, wherein said plate thickness is a distance between opposite major surfaces of said metal plate; and bonding wet frictional materials to said opposite major surfaces of said metal plate so that respective frictional surfaces of said wet frictional materials are parallel to each other.

2. A method according to claim 1, wherein said forming step comprises:

bending a belt-shaped metal plate in its longitudinal direction to be annular; and contacting opposite end surfaces of said metal plate.

3. A method according to claim 1, wherein said forming step comprises:

bending a belt-shaped metal plate in its longitudinal direction to be annular; and bringing opposite end surfaces of said metal plate toward each other without contacting said opposite end surfaces in order to form a notched portion of said wet frictional plate.

4. A method according to claim 1, wherein said forming step comprises:

working said metal plate so that at least one of said opposite major surfaces of said metal plate is inclined.

5. A method according to claim 1, further comprising a step of:

forming oil grooves on a surface of said wet frictional material.

6. A method according to claim 3, further comprising a step of:

forming oil grooves on a surface of said wet frictional material.

7. A method according to claim 3, further comprising a step of:

forming chamfered portions at said notched portion of said wet frictional plate.

8. A method according to claim 3, wherein said step of bringing the opposite end surfaces of said metal plate toward each other comprises:

positioning opposite ends of said metal plate in different planes.

9. A wet frictional plate for use in a multi-plate frictional engagement device produced by a method comprising steps of:

forming a metal plate to be a core metal of said wet frictional plate and to have a plate thickness which changes to gradually increase from an outer circumferential side of said metal plate toward an inner circumferential side of said metal plate, wherein said plate thickness is a distance between opposite major surfaces of said metal plate; and bonding wet frictional materials to said opposite major surfaces of said metal plate so that respective frictional surfaces of said wet frictional materials are parallel to each other.

10. A wet frictional plate as recited in claim 9, wherein said forming step comprises:

bending a belt-shaped metal plate in its longitudinal direction to be annular; and contacting opposite end surfaces of said metal plate.

11. A wet frictional plate as recited in claim 9, wherein said forming step comprises:

bending a belt-shaped metal plate in its longitudinal direction to be annular; and bringing opposite end surfaces of said metal plate toward each other without contacting said opposite end surfaces in order to form a notched portion of said wet frictional plate.

12. A wet frictional plate as recited in claim 9, wherein said forming step comprises:

working said metal plate so that at least one of said opposite major surfaces of said metal plate is inclined.

13. A wet frictional plate as recited in claim 9, further comprising a step of:

forming oil grooves on a surface of said wet frictional material.

14. A wet frictional plate as recited in claim 11, further comprising a step of:

forming oil grooves on a surface of said wet frictional material.

15. A wet frictional plate as recited in claim 11, further comprising a step of:

forming chamfered portions at said notched portion of said wet frictional plate.

16. A wet frictional plate as recited in claim 11, wherein said step of bringing the opposite end surfaces of said metal plate toward each other comprises:

positioning opposite ends of said metal plate in different planes.

17. A method of producing a wet frictional plate for use in a multi-plate frictional engagement device comprising steps of:

forming a metal plate to be a core metal of said wet frictional plate and to have a plate thickness which changes to gradually increase from an outer circumferential side of said metal plate toward an inner circumferential side of said metal plate; and bonding wet frictional materials to opposite surfaces of said metal plate while pressing and heating so that respective frictional surfaces of said wet frictional materials are parallel to each other, wherein said forming step comprises:

bending a belt-shaped metal plate in its longitudinal direction to be annular; and contacting opposite end surfaces of said metal plate.

18. A method of producing a wet frictional plate for use in a multi-plate frictional engagement device comprising steps of:

forming a metal plate to be a core metal of said wet frictional plate and to have a plate thickness which changes to gradually increase from an outer circumferential side of said metal plate toward an inner circumferential side of said metal plate; and bonding wet frictional materials to opposite surfaces of said metal plate while pressing and heating so that respective frictional surfaces of said wet frictional materials are parallel to each other, wherein said forming step comprises:

bending a belt-shaped metal plate in its longitudinal direction to be annular; and bringing opposite end surfaces of said metal plate toward each other without contacting said opposite end surfaces in order to form a notched portion of said wet frictional plate.

19. A wet frictional plate for use in a multi-plate frictional engagement device, said wet frictional plate comprising:

a core metal comprising a metal plate having a plate thickness which changes to gradually increase from an outer circumferential side of said metal plate toward an inner circumferential side of said metal plate, wherein said plate thickness is a distance between opposite major surfaces of said metal plate; and wet frictional materials bonded to said opposite major surfaces of said metal plate so that respective frictional surfaces of said wet frictional materials are parallel to each other.

20. A method according to claim 1, wherein said bonding step comprises pressing and heating said wet frictional materials.

21. A wet frictional plate as recited in claim 9, wherein said bonding step comprises pressing and heating said wet frictional materials.

22. A wet frictional plate as recited in claim 19, wherein a density of said wet frictional materials increases in a direction from an outer circumferential portion of said wet frictional plate toward an inner circumferential portion of said wet frictional plate.

23. A method according to claim 4, wherein said forming step comprises:

working said metal plate so that one of said opposite major surfaces of said metal plate is perpendicular to a center axis of said wet frictional plate.

24. A wet frictional plate as recited in claim 19, wherein one of said opposite major surfaces of said metal plate is perpendicular to a center axis of said wet frictional plate.

25. A method according to claim 1, wherein said bonding step comprises compressing the wet frictional materials against the opposite major surfaces of said metal plate so that a density of said wet frictional materials increases in a direction from an outer circumferential portion of said wet frictional plate toward an inner circumferential portion of said wet frictional plate.

* * * * *